April 25, 1933.    W. R. SIMPSON    1,906,201
BURNISHING MACHINE
Filed Aug. 22, 1931    2 Sheets-Sheet 1
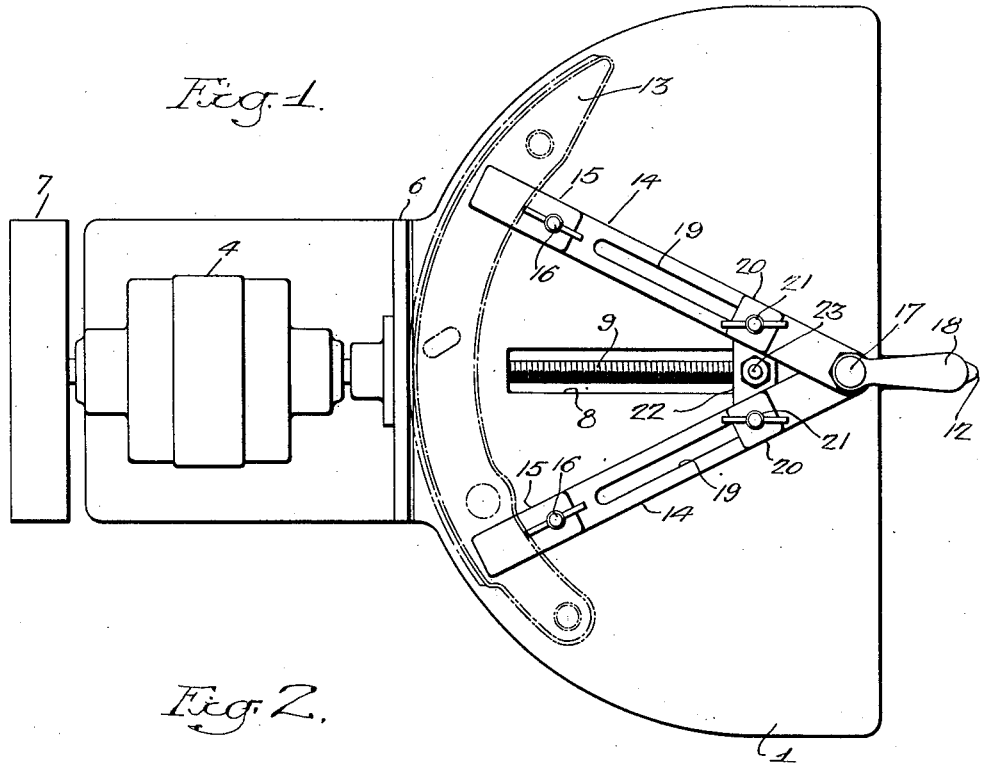
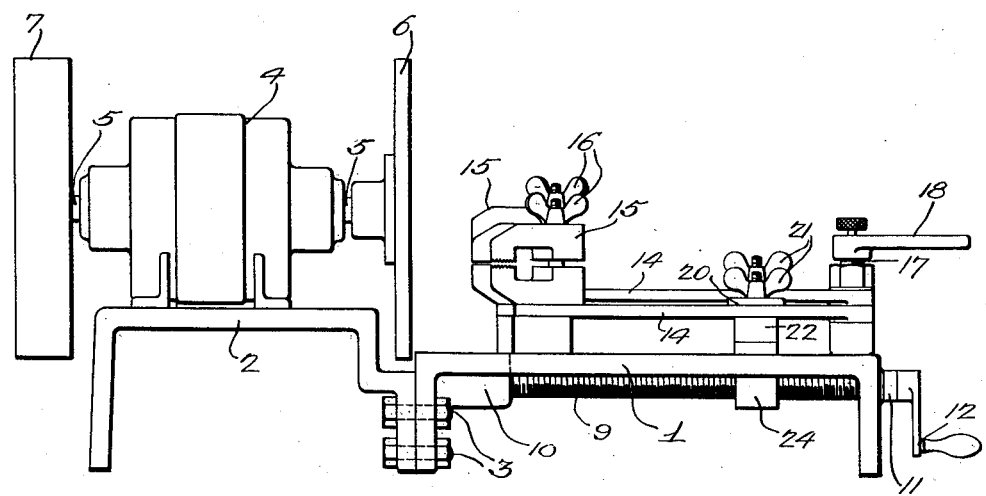

April 25, 1933.   W. R. SIMPSON   1,906,201
BURNISHING MACHINE
Filed Aug. 22, 1931   2 Sheets-Sheet 2
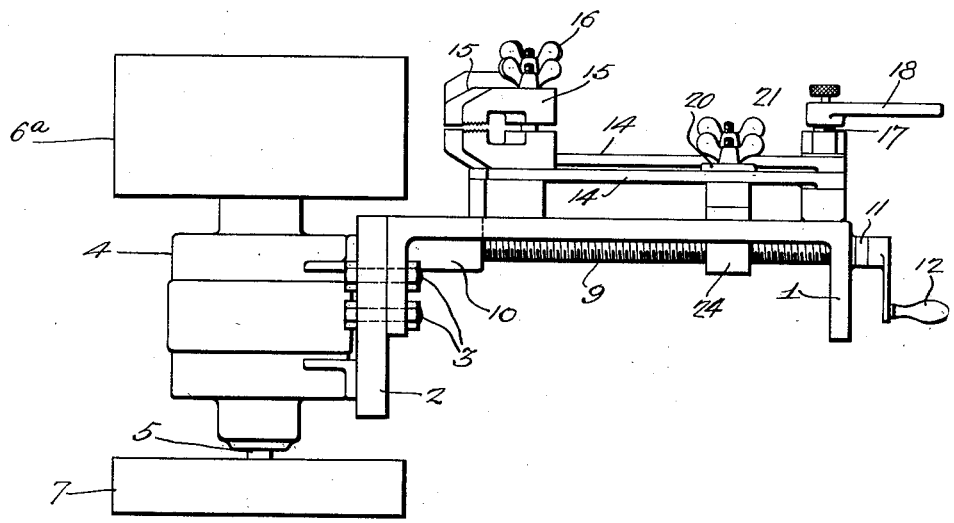

Patented Apr. 25, 1933

1,906,201

UNITED STATES PATENT OFFICE

WILLIAM R. SIMPSON, OF CRESTON, NEW JERSEY, ASSIGNOR TO THERMOID RUBBER COMPANY, OF TRENTON, NEW JERSEY, A CORPORATION OF NEW JERSEY

BURNISHING MACHINE

Application filed August 22, 1931. Serial No. 558,819.

This invention relates to new and useful improvements in burnishing machines and more particularly to machines adapted for burnishing brake shoe linings.

The principal object of the invention is to provide a novel machine which is capable of burnishing brake linings of a complete range of the various sizes of brake shoes.

Another object of the invention is to provide a machine of the character set forth which is capable of accurately burnishing and producing a true contact arc with the lining surface.

Another object of the invention is to provide a machine of the character described which is a practical and inexpensive device for burnishing brake shoe linings.

Other novel features and details embodied in my invention are set forth hereinafter and disclosed in the accompanying drawings, in which:

Figure 1 is a plan view of a machine made in accordance with my invention;

Fig. 2 is a side elevation view of the disclosure of Fig. 1; and

Fig. 3 is a side elevation view of a modification of the machine made in accordance with my invention.

The problem of properly burnishing or grinding brake linings mounted on the brake shoes, has arisen on several occasions, and heretofore no suitable and inexpensive means has been found capable of accomplishing the operation in an accurate manner, to produce a true arc on the line surface. Also heretofore, such devices of the character of this invention, have been placed on the market but have been economically undesirable in view of the incapability thereof to handle a complete range of the various sizes of brake shoes.

Brake and automobile manufacturers, in the usual course, possess special machines for burnishing brake linings, these machines being adapted only to the particular style and size of the brake shoe manufactured by them and are very expensive machines and could not be used in small independent brake lining stations by reason of the high investment cost.

By my invention I provide a machine for burnishing brake linings which may be used in conjunction with a complete range of various sizes of brake shoes and results in the production of a true arc on the lining surface. Furthermore such a machine made in accordance with my invention, embodies an extremely small investment cost and is a very desirable device from an economic standpoint for small service stations.

Referring now more particularly to the drawings, a burnishing machine made in accordance with my invention comprises in the present instance a base consisting of a brake shoe supporting section 1 and a motor supporting section 2, the said sections having their adjacent ends securely joined by means of bolts 3. A motor 4 is mounted on the base section 2 and has the shaft 5 thereof extending outwardly of each end of the motor substantially parallel with the longitudinal axis of the combined base sections 1 and 2. A metallic disk 6, either plain for burnishing, or roughened for grinding purposes, is mounted on the inner end of the shaft 5 and a wire brush disk 7 for cleaning purposes, is mounted on the outer end of the shaft 5 of the said motor 4.

The base section 1 in the present instance is provided with an elongated slot 8 coinciding with the longitudinal center line of the machine. A threaded screw shaft 9 is rotatably mounted in bearings 10 and 11 below the said slot 8 and parallel with respect thereto. Rotation of the threaded screw shaft 9 is effected by means of a crank 12 rigidly mounted on the outer extremity thereof.

The brake shoe and lining assembly 13, shown in dotted lines in Fig. 1 of the drawings, is mounted for the burnishing operation on the radial support arms 14, the said brake shoe assembly 13 being secured to the said arms 14 by means of the jaw clamps 15 which are tightened or loosened, as may be desired, by the wing nuts 16. The centered extremities of the radial arms 14 are mounted on a common spindle 17 on which is mounted an operating lever 18. The radial arms 14 are further provided with the longitudinal slots 19 affording guideways for the slidably mounted clamps 20 which may be secured in a desired position in the slots by means of the wing lock nuts 21. The lower extremities of the clamps 20 are each secured to one end of a transverse cross head member 22 which is pivotally mounted at 23 on the depending lug 24 threaded on the aforementioned screw 9.

Rotation of the screw 9 in one direction will move the lug 24 inwardly with respect to the machine and rotation thereof in the opposite direction will move the lug 24 outwardly with respect thereto. Movement of the lug 24 longitudinally of the machine, causes the clamps 20 connected to the movable lug 24 by means of the pivotally mounted cross head 23 to move radially with respect to the machine in the slots 19 of the radial support arms 14, producing a change in the radius of the support arms 14 about the pivot point 23 to accurately support the surfaces of various sizes of brake shoes in true contact with the wheel 6.

In the burnishing or otherwise treating of a brake shoe assembly 13, the wing nuts 21 of the clamps 20 are loosened, and to permit accurate burnishing of the lining with the disk 6 contacting with said lining in a true arc, the radial support arms 14 are set to the proper radius of said brake shoe by turning the crank 12, rotating the threaded shaft 9, and thus moving the cross head 22 and the lugs 24 to the required position in the slots 19 longitudinally of the said support arms 14. When the support arms 14 have been properly positioned to produce the required radius about the pivot point 23 to contact the specific surface with the wheel 6, the clamps are locked in respective positions in the slots 19 by tightening the wing lock nuts 21 which had previously been loosened to permit the movement of the clamps 20 in said slots.

When the position and radius of the support arms 14 has been determined the brake shoe assembly 13 is secured on the support arms 14 in the clamps 15 which are tightened by the lock nuts 16 thereon. The motor 4 is then started rotating the disk 6 and the burnishing of the lining of the brake shoe assembly 13 is accomplished by reciprocating the lever 18 horizontally in an arc, thereby pivoting the support about the point 23 and contacting every portion of the curved surface of the brake lining mounted on the brake shoe with the grinding or burnishing disk 6.

In Fig. 3 of the drawings I have shown a modification of my invention wherein the motor 4 is mounted with the shaft 5 thereof positioned vertically with respect to the machine. With the motor so positioned it is desirable to mount a wheel 6a, having a sufficiently large peripheral surface, at the upper end of the motor shaft 5. The burnishing or grinding operation is effected in a manner substantially similar to that described above with the exception that the contact of the brake lining in this instance is against the peripheral surface of the wheel rather than against the face thereof as described above.

I construct the base of the machine of two sections, 1 and 2 respectively, solely for the purpose of permitting the mounting of the shaft 5 of the motor 4 and the wheel 6 in either a horizontal or vertical position with respect to the said machine. It will be noted that burnishing or grinding against the peripheral surface of the wheel as in Fig. 3 of the drawings, will effect a uniform speed of rubbing at all points on the brake lining, whereas burnishing or grinding against the face of such a wheel, as in Fig. 1 of the drawings, effects a variable speed of rubbing, dependent entirely upon the distance of the lining surface radially from the geometric center of the said disk.

While I have set forth certain specific forms of my invention, it will be apparent that certain other detailed changes and modifications may be made therein except as is limited by the appended claims.

I claim:

1. In a machine for burnishing friction surfaces, a wheel, a shaft, a member mounted thereon and arranged for advancement or retraction with respect to said wheel, a cross piece pivotally mounted on said movable member, arms for supporting the friction elements to be treated, the said arms being pivotally connected at their opposite ends and having a slot therein, means at the ends of the transverse piece engaging the slots and supporting said arms, said means being releasable and slidable in the slot to permit the effective radius of the arms with respect to the pivot point of the cross piece to be varied, and means for pivoting said arms with respect to the wheel.

2. In a machine for burnishing friction surfaces, a wheel, means for rotating said wheel, a shaft, a member threaded thereon and arranged for advancement or retraction with respect to said wheel, a transverse cross piece pivotally mounted on said member, arms for supporting the friction elements to be treated, clamp means at the radial extremity of each of said arms, the said arms being pivotally connected at their opposite ends, and having a longitudinal slot therein, means at the ends of the transverse piece engaging the slots and supporting said arms, said means being releasable and slidable in the slot to permit the effective radius of the arms with respect to the pivot point of the cross piece to be varied, and means for pivoting said arms with respect to the wheel.

3. In a machine for burnishing friction surfaces, a wheel positioned for frictional contact with said surfaces, a shaft, a member mounted thereon and arranged for advancement or retraction with respect to said wheel, a cross piece pivotally mounted on said movable member, arms for supporting the friction elements to be treated, the said arms being pivotally connected at their opposite ends and having a slot therein, means at the ends of the transverse piece engaging the slots and supporting said arms, said means being releasable and slidable in the slot to permit the effective radius of the arms with respect to the pivot point of the cross piece to be varied, means for pivoting said arms with respect to the wheel, and means for positioning the wheel to effect peripheral contact thereof with the friction surfaces.

4. In a machine for burnishing friction surfaces, a wheel, a shaft, a member mounted thereon and arranged for advancement or retraction with respect to said wheel, a cross piece pivotally mounted on said movable member, arms for supporting the friction elements to be treated, the said arms being pivotally connected at their opposite ends and having a slot therein, means at the ends of the transverse piece engaging the slots and supporting said arms, said means being releasable and slidable in the slot to permit the effective radius of the arms with respect to the pivot point of the cross piece to be varied, means for pivoting said arms with respect to the wheel, and means operatively associated with the machine for cleaning the friction surface independently of the burnishing operation.

5. In a machine for burnishing friction surfaces, a wheel positioned for frictional contact with said surfaces, a shaft, a member mounted thereon and arranged for advancement or retraction with respect to said wheel, a cross piece pivotally mounted on said movable member, arms for supporting the friction elements to be treated, the said arms being pivotally connected at their opposite ends and having a slot therein, means at the ends of the transverse piece engaging the slots and supporting said arms, said means being releasable and slidable in the slot to permit the effective radius of the arms with respect to the pivot point of the cross piece to be varied, means for pivoting said arms with respect to the wheel, means for positioning the wheel to effect peripheral contact thereof with the friction surfaces, and means operatively associated with the machine for cleaning the friction surface independently of the burnishing operation.

6. In a machine for burnishing friction surfaces of friction elements, a wheel positioned for friction contact with said surfaces, a shaft, a member threaded thereon and arranged for advancement or retraction with respect to said wheel, a transverse cross piece pivotally mounted on said member, arms for supporting the friction elements to be treated, clamp means at the radial extremity of each of said arms, the said arms being pivotally connected at their opposite ends, and having a longitudinal slot therein, means at the ends of the transverse piece engaging the slots and supporting said arms, said means being releasable and slidable in the slot to permit the effective radius of the arms with respect to the pivot point of the cross piece to be varied, means for pivoting said arms with respect to the wheel, and means for positioning the wheel to effect peripheral contact thereof with the friction surfaces.

7. In a machine for burnishing friction surfaces of friction elements, a wheel positioned for frictional contact with said surfaces, a shaft, a member threaded thereon and arranged for advancement or retraction with respect to said wheel, a transverse cross piece pivotally mounted on said member, arms for supporting the friction elements to be treated, clamp means at the radial extremity of each of said arms, the said arms being pivotally connected at their opposite ends, and having a longitudinal slot therein, means at the ends of the transverse piece engaging the slots and supporting said arms, said means being releasable and slidable in the slot to permit the effective radius of the arms with respect to the pivot point of the cross piece to be varied, means for pivoting said arms with respect to the wheel, means for positioning the wheel to effect peripheral contact thereof with the friction surfaces, and means operatively associated with the machine for cleaning the friction surface independently of the burnishing operation.

WILLIAM R. SIMPSON.